United States Patent [19]

Lesher et al.

[11] Patent Number: 5,052,664

[45] Date of Patent: Oct. 1, 1991

[54] ARCUATE SPRING

[75] Inventors: Roger P. Lesher, Brighton; John J. Starzec, Azalia, both of Mich.

[73] Assignee: Barnes Group Inc., Bristol, Conn.

[21] Appl. No.: 430,223

[22] Filed: Nov. 1, 1989

[51] Int. Cl.[5] .................... F16F 1/06; F16D 3/66
[52] U.S. Cl. ................................ 267/167; 267/180; 464/67
[58] Field of Search ............... 267/150, 174, 166, 160, 267/180, 182, 167; 140/3 CA, 103; 464/67, 68, 64, 66; 192/106.2, 106.1

[56] References Cited

U.S. PATENT DOCUMENTS

| | | |
|---|---|---|
| 446,123 | 2/1891 | Pyle . |
| 863,034 | 8/1907 | Mason .............................. 267/167 |
| 1,522,774 | 1/1925 | Foote . |
| 1,976,871 | 10/1934 | Wine ................................ 153/48 |
| 2,039,844 | 5/1936 | Howland-Shearman ............. 192/46 |
| 2,351,726 | 6/1944 | Wallace ............................ 267/61 |
| 2,400,319 | 5/1946 | Tallion ............................. 29/227 |
| 2,622,215 | 12/1952 | Piekarski et al. .................... 310/84 |
| 2,640,572 | 6/1953 | O'Brien ............................ 192/3.2 |
| 2,666,723 | 1/1954 | Stewart ............................ 148/12 |
| 2,991,064 | 7/1961 | DeJean ............................. 267/167 |
| 3,186,701 | 6/1965 | Skinner, Sr. ....................... 267/167 |
| 3,187,416 | 6/1965 | Tuetey et al. ...................... 29/173 |
| 3,190,633 | 6/1965 | Jack ................................ 267/167 |
| 3,259,222 | 7/1966 | Jania ............................... 192/68 |
| 3,276,761 | 10/1966 | Becker ............................. 267/167 |
| 3,359,617 | 12/1967 | Baumler ........................... 267/167 |
| 3,362,194 | 1/1968 | Bertelson et al. ..................... 64/27 |
| 3,399,881 | 9/1968 | White . |
| 3,426,410 | 2/1969 | Kirchgasser ....................... 29/227 |
| 3,456,321 | 7/1969 | Furt et al. ......................... 29/173 |
| 3,456,684 | 7/1969 | Sochting ....................... 267/167 X |
| 3,468,527 | 9/1969 | Mather ............................ 267/167 |
| 3,711,917 | 1/1973 | Baumgras .......................... 29/173 |
| 4,022,640 | 5/1977 | Tanczyn ....................... 267/166 X |
| 4,138,003 | 2/1979 | Malloy ............................ 192/3.29 |
| 4,143,561 | 3/1979 | Melhorn ........................... 74/730 |
| 4,279,132 | 7/1981 | Lamarche ......................... 64/27 C |
| 4,304,107 | 12/1981 | Fall et al. ......................... 64/27 C |
| 4,427,098 | 1/1984 | Kubo et al. ....................... 192/3.28 |
| 4,430,064 | 2/1984 | Lamarche .......................... 464/64 |
| 4,484,898 | 11/1984 | Kohno ............................. 464/64 |
| 4,530,673 | 7/1985 | Lamarche .......................... 464/64 |
| 4,568,394 | 2/1986 | Cassell ............................ 148/12 B |
| 4,810,231 | 3/1989 | Weissenberger et al. ....... 267/180 X |
| 4,880,217 | 11/1989 | Navarro et al. .................... 267/167 |
| 4,903,985 | 2/1990 | Muhr et al. ................... 267/180 X |
| 4,904,225 | 2/1990 | Worner et al. ..................... 464/67 |

Primary Examiner—Robert J. Oberleitner
Attorney, Agent, or Firm—Pennie & Edmonds

[57] ABSTRACT

An arcuate spring having a plurality of helical coils which are configured and dimensioned to provide an arcuate shape to the spring and being substantially free of internal stressses which would tend to urge the coils into linear alignment. The spring is designed to function under load conditions while maintaining its natural arcuate shape. The spring is adapted for use in a channel having an arcuate shape approximately matching that of the spring itself, for providing resilient force in a direction tangential to the arcuate centerline of the spring at its contact ends.

17 Claims, 3 Drawing Sheets

ARCUATE SPRING

TECHNICAL FIELD

The present invention relates to an arcuate spring, a method of making same and to the use of the arcuate spring in a torsional vibration damper assembly.

BACKGROUND OF THE INVENTION

Vibration in a vehicle drive train has been a long-standing problem, and a torsional vibration damper assembly is desirable to neutralize any torsional vibrations emanating from the vehicle engine which could result in undesirable impact loads, vibration, noise, etc.

Heretofore, torsional vibration damper assemblies have usually comprised straight resilient means, such as coil springs, which were forcibly bowed through the use of clips, wedges, spring separators or dividers, or the like to obtain the desired arcuate shape. In addition, a plurality of shorter straight springs were sometimes substituted for the longer bowed springs along the path that would have been occupied by the longer bowed springs. Such configurations, however, were complicated, requiring a plurality of precise parts to complete the assembly. Thus, such assemblies were difficult to manufacture, maintain and operate, which translates into a higher product cost.

Thus, there is a need for arcuate springs to improve the performance and lower the manufacturing cost of such assemblies.

SUMMARY OF THE INVENTION

The present invention relates to a helical spring comprising a plurality of coils which are configured and dimensioned to provide an arcuate shape to the spring in its free or natural state. Further, the coils of the arcuate spring are free of internal stresses which would tend to urge the coils into linear alignment, and the arcuate spring has a strength sufficient to resiliently absorb and release forces in either arcuate direction along an arcuate path.

Preferably, the spring is made of a hardenable or hardened steel, and is capable of achieving a Rockwell C hardness of at least 20 to 60 and generally between about 45 and 55, with a tensile strength of at least 100,000 psi.

The invention also relates to a method for making an arcuate helical spring by forming a straight helical spring; prestressing the spring to an arcuate shape; heat treating the spring at elevated temperatures for a sufficient time to relieve stresses and obtain an arcuate spring; and recovering the arcuate spring at ambient temperatures.

In this method, the straight spring is generally prestressed by use of a fixture, and the spring is heat treated subsequent to being prestressed by the fixture. Alternatively, the straight spring may be heated prior to the prestressing step and then prestressed by use of a the fixture.

The heat treating step includes a step of cooling the spring to ambient temperature. In one embodiment, this cooling step comprises quenching the spring into a liquid which includes water optionally containing a soluble oil. Instead, the spring may be air cooled to ambient temperatures. For either embodiment, the spring is released from the fixture after being cooled to room temperature.

When desired, the ends of the spring are ground to a flat condition. Preferably, the ends of the straight spring are ground prior to prestressing.

This invention further relates to an application of the arcuate helical spring in a torsional vibration damper assembly. The arcuate configuration eliminates the need to forcibly bow straight springs so that they may be received in the damper housing, and this configuration also eliminates the need to replace a longer bowed spring with a plurality of shorter straight springs.

Further objects of this invention are to provide a construction of maximum simplicity, efficiency, economy, and ease of assembly and operation, and such further objects, advantages and capabilities as will later more fully appear and are inherently possessed by this invention.

BRIEF DESCRIPTION OF THE DRAWINGS

Further advantages of the invention will be appreciated by reviewing the attached drawing figures, which illustrate an application of the arcuate spring in a torsional vibration damper assembly, and wherein.

DESCRIPTION OF THE PREFERRED EMBODIMENTS

Figure 1:
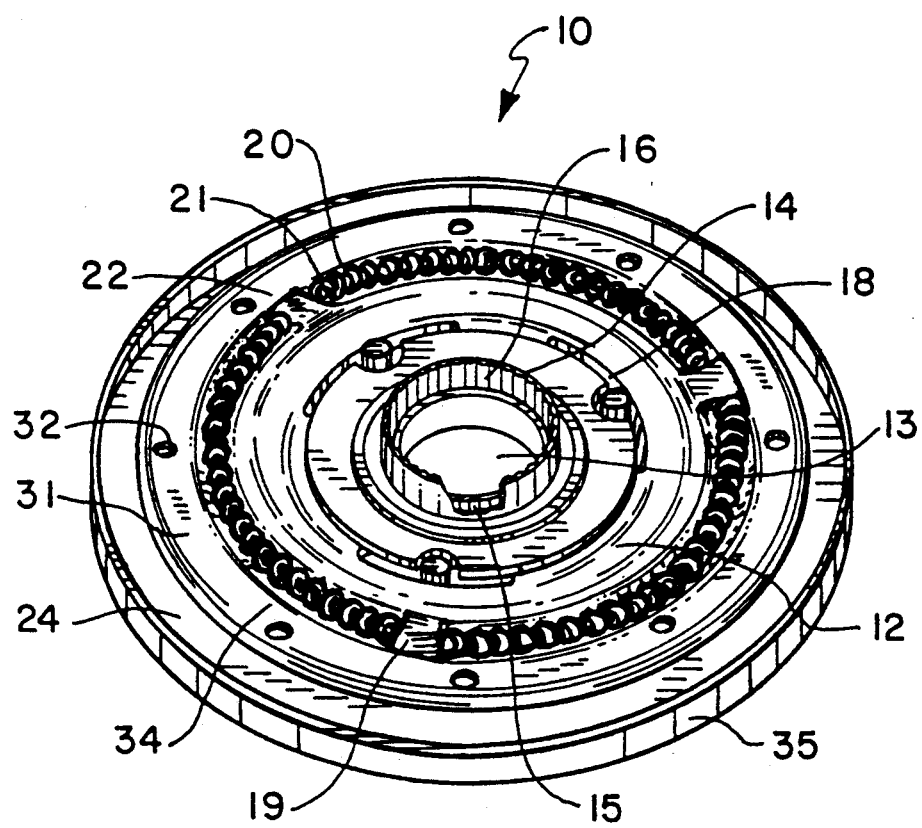
FIG. 1 is a rear elevational view of the torsional vibration damper assembly.
Figure 2:
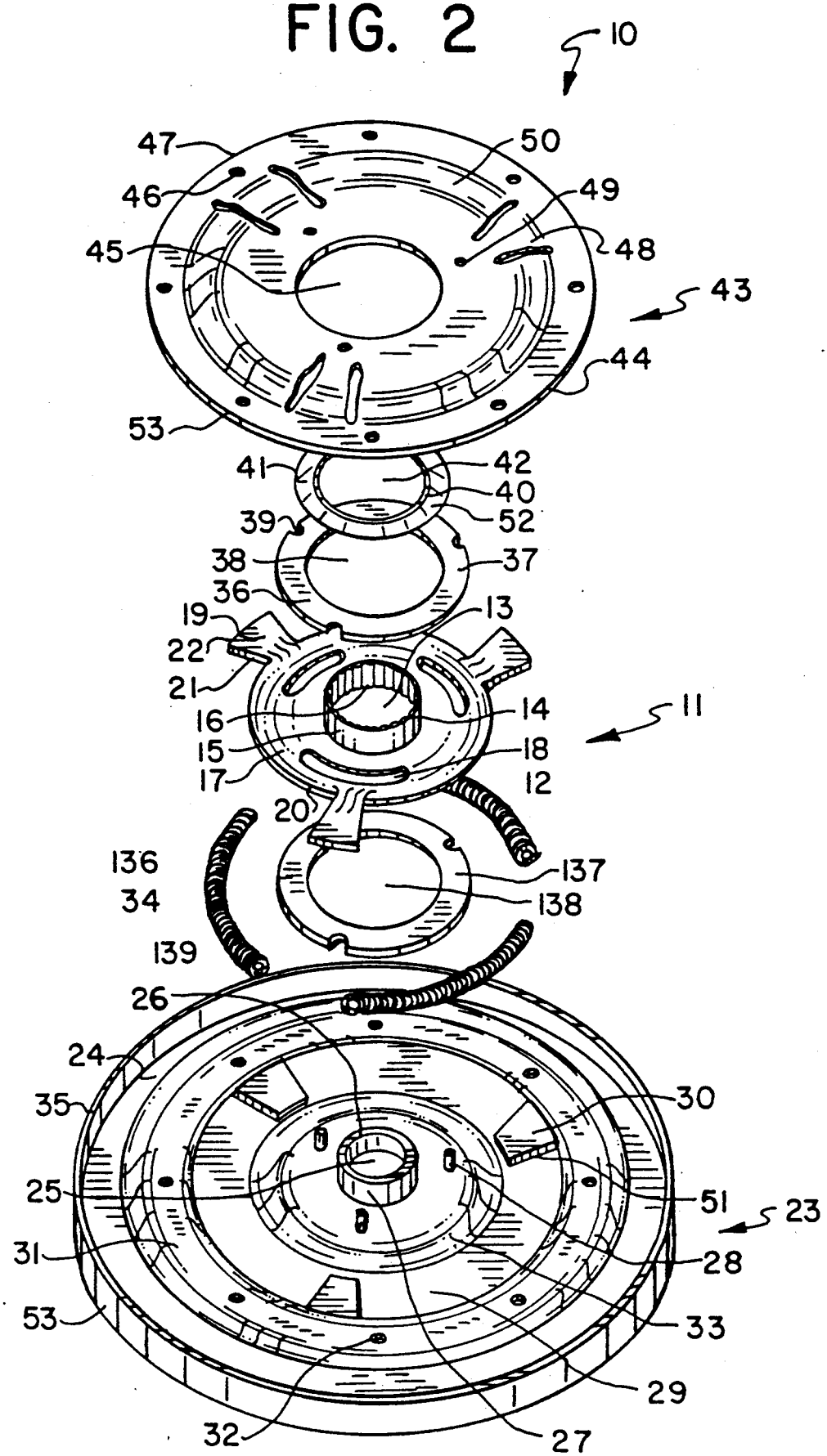
FIG. 2 is an exploded perspective view of the torsional vibration damper assembly.

FIGS. 1 and 2 disclose a known torsional vibration damper assembly 10 adapted to be operatively connected to torque input means and to torque output means (not shown). While the arcuate helical spring of the present invention may be utilized in any number of torsional vibration damper assembly configurations, the following torsional vibration damper assembly configuration is provided for illustrative purposes only. In no way is this illustration intended to limit the scope of the application, in torsional vibration damper assemblies or otherwise, for the arcuate helical spring of the invention.

The damper assembly 10 includes a hub assembly 11 in the form of an annular ring 12 having a central opening 13 comprising a barrel 14 with shoulders 15. The barrel 14 has internal splines or teeth 16 on the inner periphery of the shoulder 15 which engage torque output means (not shown). The hub assembly 11 further comprises a base portion 17 having three equally spaced elongated grooves 18 and three circumferentially equally spaced hub fingers 19 which are formed on the outer ring periphery 20 and are aligned with the midpoint of the grooves 18. The outer ring periphery 20 is slightly offset away from the barrel 14 so as to position the hub fingers 19 on a parallel horizontal plane slightly lower than the base portion 17. Therefore, the hub fingers 19 will be positioned deeper into the elongated arcuate recesses 29 when the hub assembly is positioned on the first retainer plate 23. Each hub finger has a pair of generally outwardly diverging sides 21 and a circumferential end 22 which is aligned with the outer edge of the elongated arcuate recesses 29.

The torsional vibration damper housing 53 is operatively connected to torque input means (not shown), and comprises a first retainer plate 23 and a second retainer plate 43. The hub assembly is located on the first retainer plate 23.

The first retainer plate 23 comprises an annular ring 24 having a central opening 25 comprising a barrel 26 with shoulders 27. The circumference of the barrel 26 is positioned and configured to matingly engage the inner circumference of the barrel 14 of the hub assembly 11. First retainer plate 23 further comprises three equally spaced guiding pins 28 positioned and configured to cooperate with the three equally spaced elongated grooves 18. Three equally spaced elongated arcuate recesses 29, which are integral with the first retainer plate 23, are separated by three spring separators 30. The spring separators 30 are affixed to the first retainer plate 23 and are normally axially and radially aligned with the hub fingers 19. The spring separators have a generally trapezoidal body with the narrow end positioned towards the center of the first retainer plate 23 and with outwardly diverging sides extending to the larger base which is circumferentially aligned with the outer edge of the recess 29.

The arcuate recesses 29 are each defined by an outer inclined lip 31 having a plurality of circumferentially spaced openings 32 and an inner curved lip 33, and act to receive arcuate springs 34 therein. The radial outward end of the outer inclined lip 31 drops substantially perpendicularly into the annular ring 24. The other side of said annular ring 24 is adapted to frictionally engage the torque input means. The outer periphery of said annular ring 54 comprises a substantially perpendicular shoulder 35.

The second retainer plate 43 is also in the form of an annular ring 44 with the outer ring periphery 47 offset from the inner periphery 50. A plurality of circumferentially equally spaced openings 46 formed on the outer ring periphery 47 are aligned with the plurality of openings 32 of the first retainer plate 23 to receive suitable securing means, such as rivets, to couple the first retainer plate 23 and second retainer plate 43 together. When the first retainer plate 23 and second retainer plates 43 are secured together, the inner periphery 50 of the second retainer plate will be offset away from the center of the vibration damper housing 53, thereby completing the top portion of the elongated arcuate recesses 29 in the first retainer plate 23.

The second retainer plate further comprises a central opening 45 and three circumferentially equally spaced drive straps 48. The drive straps 48 are indentations in the inner periphery of the second retainer plate 43 and are operatively associated and aligned with the three hub fingers 19, the three spring separators 30 and three circumferentially equally spaced openings 49. Openings 49 are located along the inner periphery 50 of the second retainer plate 43, are aligned with the registration means 39, 139 of washers 36, 136 and are operatively associated with the guiding pins 28 of first retainer plate 23.

Washers 36, 136 in the form of an annular ring 37, 137 having a central opening 38, 138 and three circumferentially equally spaced registration means 39, 139 which are positioned to operatively associate with guiding pins 28 of the first retainer plate 23, act as separation means between hub assembly 11, first retainer plate 23 and second retainer plate 43. A washer 40 in the form of an annular ring 41 having a central opening 42 and sides 52 which are inclined with respect to a horizontal plane acts as separation means between washer 36 and second retainer plate 43.

Heretofore, the resilient means utilized in the above-described torsional vibration damper assembly comprised nine conventional straight springs and six steel balls. However, in one application of the arcuate helical spring of the present invention, the plurality of components comprising the above-described resilient means are replaced by only three arcuate helical springs, as shown in FIGS. 1 and 2. The arcuate helical springs in the present example are manufactured to be close-fitting and substantially congruent with the elongated arcuate recesses 29. Therefore, the helical springs 34 are adapted to easily fit in the elongated arcuate recesses 29 in between the spring separators 30, hub fingers 19 and drive straps 48 without the need for forced bowing, clips, wedges or the like.

In operation, the vibration damper housing 53 which is connected to torque input means rotates upon the application of torque. This rotation causes the springs 34 to be compressed by the drive straps 48 and sides 51 of the spring separators 30 against the sides 21 of the hub fingers 19. This compression of the arcuate helical spring 34 is along the same arcuate line of action as the rotation of the drive straps 48 and sides 51 of the spring separators 30. Instantaneously after this compression, the side of the helical spring 34 being compressed against the side 21 of the hub finger 19 will push against that side 21 in the same direction as the rotation of the vibration damper housing 53 so as to align the hub finger 19 with the drive straps 48 and spring separators 30. This expansion of the arcuate helical spring 34 is also along the same arcuate line of action as the rotation of the hub finger 19. Thus, the entire assembly will be aligned as it was before the application of torque and the springs 34 will no longer be compressed. This operation acts to obviate the adverse effects of uneven or rapid positive and negative torques in a manual clutch or lock-up clutch in a torque converter.

The operation of the torsional vibration damper assembly with the arcuate helical springs 34 will be smoother than the operation of a torsional vibration damper assembly which utilizes forcibly bowed straight springs. A forcibly bowed straight spring is constantly experiencing internal stresses which tend to straighten the spring. Thus, the forcibly bowed straight spring rubs against and interferes with the sides of the elongated arcuate recess 29, inhibiting smooth operation. However, the arcuate spring 34 is manufactured to conform to and fit within the elongated arcuate recess 29 of the first retainer plate 23. Thus, there are no internal residual stresses tending to straighten the spring and there is no interference between the arcuate helical spring 34 and the sides of the elongated recesses 29. Thus, the operation of the torsional vibration damper assembly 10 with the arcuate helical springs 34 is smooth and unobstructed.

The arcuate helical springs 34 will also provide improved attenuation or damping of spring vibrations than the conventional vibration damper which utilizes straight springs for the same reasons as specified above. In addition, the compression of the arcuate spring to a "solid" configuration, i.e., where each coil contacts each adjacent coil, operates as a stop in the system independently of the use of other means, such as pins.

Undesirable stressing in the arcuate helical spring will also be avoided due to the springs arcuate shape, thereby improving the efficient use of the vibration damper assembly. A straight spring forcibly bowed upon assembly experiences stresses due to the unnatural installation that are opposite in direction to the stresses which arise in the spring through use in the torsional vibration damper assembly. Springs installed in this manner experience stresses in one direction with the unit at rest. As torque is applied to the unit and increased, the springs deflect until at a point where these stresses diminish to zero. Further loading and deflection results in these stresses increasing in the opposite direction. This bi-directional stressing reduces the stress allowable to avoid excessive relaxation or breakage that can be experienced by the spring in service. In contrast, the body of the arcuate spring will experience only normal uni-directional stressing because the arcuate spring is received in the housing in its natural arcuate state. Thus, the arcuate spring will not be overly stressed, thereby increasing the useful capacity and service life of the vibration damper assembly.

The durability of the vibration damper assembly is also increased due to the reduction in the number of springs required for operation. Spring ends have historically been subject to bending fatigue breakage near the tips of the ground end coils. In conventional torsional vibration damper assemblies, a plurality of straight springs were employed, thereby increasing the number of ground ends and providing greater opportunities for failure. However, since a single arcuate spring may replace a plurality of shorter straight springs, the number of spring ends is reduced. Also, those remaining spring ends may be reinforced by making use of the saved space that results from the minimization of components in the damper. Thus, the number of potential failure locations is reduced and the life and durability of the assembly is increased.

Thus, it is apparent that the use of arcuate helical springs offers several advantages and improvements over the use of straight helical springs, particularly with respect to employment in torsional vibration damper assemblies. Because dividers, steel balls, wedges, clips, etc. are eliminated, there are fewer working components in the vibration damper assembly. Such minimization of components provides for simplicity, economy and ease of assembly in the manufacture of the torsional vibration damper assembly, and also provides for ease of maintenance, reliability, performance, and durability in operation. Such benefits translate directly into a substantial reduction in overall costs for the vibration damper assembly. The elimination of the superfluous components also makes for reduced mass and space requirements, which provides for improved travel, capacity, compliance, rate characteristics, and natural frequency of the torsional vibration damper assembly.

Figure 3:
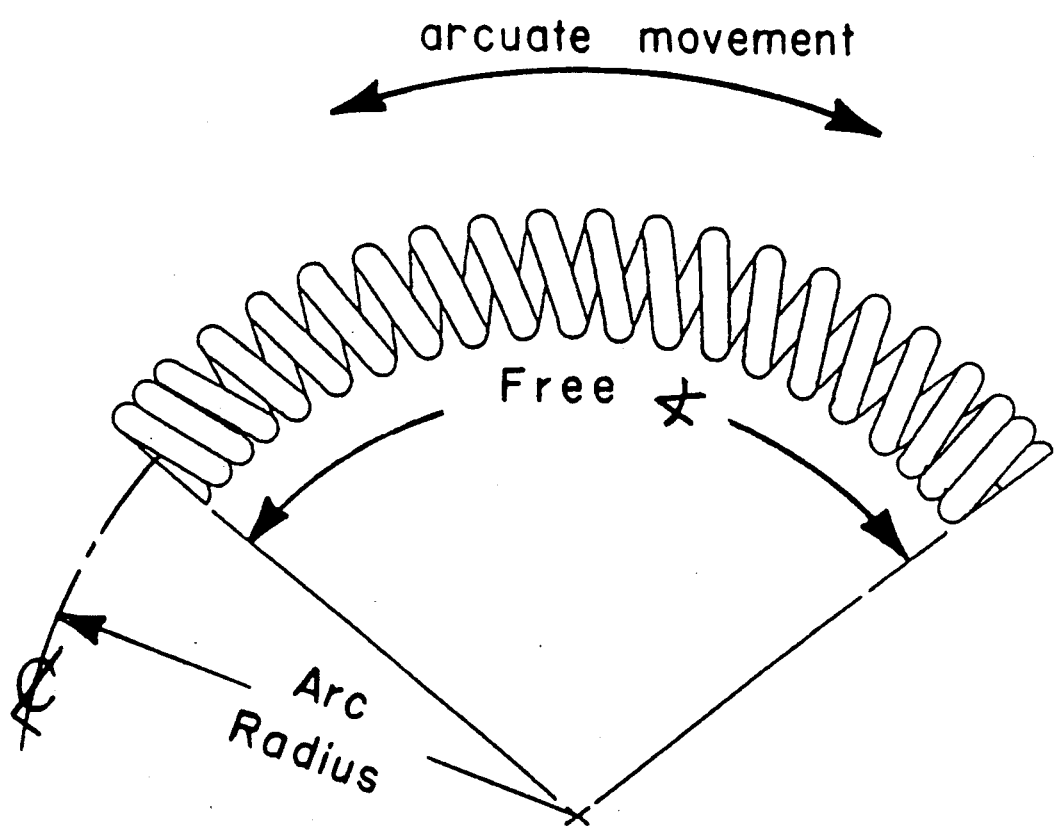
FIG. 3 is a plan view of the arcuate helical spring.

The arcuate spring of the present invention can be made by various processes. In one method, a conventionally coiled straight spring is formed by traditional helical spring manufacturing techniques. Such techniques include beginning with annealed or prehardened and tempered material of any required cross section. Current materials of choice include, but is not limited to, 1070, 6150, modified 6150, and 9254 steels, as processed into suitable quality spring wire. Preferably, round cross-section, pre-hardened and tempered (Rc 45-55) 6150 steel would be employed. The straight helical spring is bent and forced into an arc and then has a close-fitting curved rod or pin of a different free angle and arc radius (FIG. 3) than the desired free angle and arc radius of the finished arcuate spring inserted into the spring. This fixtured spring is then heat treated in a manner typical of conventional processing appropriate for the material and condition. For example, in the case of pre-hardened and tempered 6150 steel, the heat treatment would be approximately fifteen to thirty minutes at 800° F. The heated fixtured spring is then cooled either by air or liquid quench, whichever is appropriate for the material. The liquid quench would preferably be with water which has soluble oil added to it, and the temperature of the solution would be approximately room temperature. The fixture pins are then removed, at which time the helical spring will be in an arcuate configuration, free of any internal stresses which tend to straighten the spring.

Grinding of the spring ends, if required by the spring design, may be done either before or after the straight spring is processed into the arcuate spring. It would presently be more economical to perform the grinding on the springs while they are straight as conventional, existing machines may be used.

The fixture pin which is inserted into the spring may be of different free angle and arc radius (FIG. 3) than is desired for the finished free angle and arc radius of the arcuate spring so as to compensate for any "springback" which may be exhibited by the heat treated spring upon removal of the fixture pin. The properly sized fixture pin would typically be determined by routine experimentation.

The steps enumerated in the above-described process may be modified or rearranged as circumstances dictate to achieve similar results. For instance, a straight helical spring may first be heat treated, fixtured with the rod or pin while hot, and then have the rod or pin removed before it is cooled. Likewise, the spring may first be heated, fixtured while hot, cooled, and then have the rod or pin removed. In another variation, the spring may be fixtured, heat treated, and have the pins removed before cooling. In each case, the same result of producing a stress-free arcuate helical spring from a straight helical spring will be achieved.

Each of the above variations may be further modified by fixturing the springs externally with a bowed or curved tube, or dies, or a drum or mandrel about which the spring is wrapped and retained; rather than internally with a curved rod or pin. Regardless of the type of fixturing which is employed in conjunction with the above-specified steps, the final product will continue to be the arcuate helical spring which is free of any internal stresses which tend to straighten the spring.

"Prestressing" is used to define any type of action upon the spring or its coils which would cause the spring to conform to an arcuate shape, with the preferred prestressing method being the bending operation.

Another method of manufacturing the arcuate spring is to force a conventional straight spring into an arc of much exaggerated curvature by forming dies at room temperature. The resulting mechanically induced plastic deformation will produce the desired arcuate configuration. To relieve the resulting residual internal stresses due to the plastic deformation, the spring is heat treated and cooled in a manner typical of conventional heat treating techniques appropriate for the material condition. If necessary, the spring may be fixtured before, during, or after the heat treatment.

The above specification is merely illustrative of one possible application of the arcuate spring of the present invention. As such, it is intended that the appended claims cover all such applications of said arcuate spring as fall within the true spirit and scope of the present invention.

We claim:

1. An arcuate spring having a plurality of helical coils configured and dimensioned to provide an arcuate shape to the entire spring in its free state and being substantially free of internal stresses which would tend to urge said coils into linear alignment, aid spring substantially retaining said arcuate shape under load conditions and having a strength sufficient to resiliently absorb and release forces in either direction along an arcuate path.

2. The spring of claim 1 having first and second end windings which each form a planar contact surface.

3. The spring of claim 1 being made of a hardenable steel.

4. The spring of claim 1 being made of a hardened steel.

5. The spring of claim 4 wherein the steel has a Rockwell C hardness of between about 20 and 60.

6. The spring of claim 4 wherein the steel has a Rockwell C hardness of between about 45 and 55 and a tensile strength of at least 100,000 psi.

7. An arcuate spring having a plurality of helical coils configured and dimensioned to provide an arcuate shape to the entire spring in its free state and being substantially free of internal stresses which would tend to urge said coils into linear alignment, said spring substantially retaining said arcuate shape under load conditions while absorbing and releasing forces in either direction along an arcuate path.

8. A combination for exerting a resilient force in an arcuate direction comprising a spring having a plurality of helical coils configured and dimensioned to provide an arcuate shape to the entire spring in its free state and being substantially free of internal stresses which would tend to urge said coils into linear alignment, said spring operatively associated with elongated channel means having an arcuate shape corresponding to that of said arcuate spring so that said spring substantially retains said arcuate shape while absorbing and releasing forces in either direction along an arcuate path.

9. The combination of claim 8 wherein said channel means us adapted to support and guide said arcuate spring as said spring compresses or expands along the arcuate path.

10. The combination of claim 9 wherein said spring has end windings which each form a planar contact surface.

11. The combination of claim 8 wherein said spring is made of hardenable steel.

12. The combination of claim 8 wherein said spring is made of hardened steel.

13. The combination of claim 12 wherein the steel has a Rockwell C hardness of between about 20 and 60.

14. The combination of claim 12 wherein the steel has a Rockwell C hardness of between 45 and 55 and a tensile strength of at least 100,000 psi.

15. A combination for absorbing and releasing forces in an arcuate direction comprising an arcuate spring operatively associated with channel means for receiving said spring, said channel means having an arcuate shape and said arcuate spring having a plurality of helical coils configured and dimensioned to provide an arcuate shape to the entire spring in its free state, said spring arcuate shape being substantially the same as said channel means arcuate shape, such that said arcuate spring may be compresses or elongated along a path defined by the centerline of said arcuate spring without substantial interference from said arcuate channel, thus allowing said arcuate spring to provide resilient, smooth and unobstructed absorbing and releasing forces along either direction defined by the centerline of said arcuate spring.

16. The combination of claim 15 wherein said arcuate spring experiences stresses in a single direction along its centerline.

17. The combination of claim 15 wherein the compression of the arcuate spring to its solid configuration, where each coil contacts each adjacent coil, operates as a stop.

* * * * *